US008806516B2

(12) United States Patent
Kandekar et al.

(10) Patent No.: US 8,806,516 B2
(45) Date of Patent: Aug. 12, 2014

(54) METHOD AND SYSTEM FOR CONSTRUCTING AND PRESENTING A CONSUMPTION PROFILE FOR A MEDIA ITEM

(75) Inventors: Kunal Kandekar, Morrisville, NC (US); Richard J. Walsh, Raleigh, NC (US); Hugh Svendsen, Chapel Hill, NC (US)

(73) Assignee: Porto Technology, LLC, Wilmington, DE (US)

( * ) Notice: Subject to any disclaimer, the term of this patent is extended or adjusted under 35 U.S.C. 154(b) by 1758 days.

(21) Appl. No.: 12/193,844

(22) Filed: Aug. 19, 2008

(65) Prior Publication Data

US 2010/0050202 A1 Feb. 25, 2010

(51) Int. Cl.
*H04H 60/33* (2008.01)
*H04N 5/445* (2011.01)

(52) U.S. Cl.
USPC .................................. 725/9; 725/46

(58) Field of Classification Search
CPC .................... H04N 21/44204; H04N 21/44222
USPC .................................. 725/9, 22, 46
See application file for complete search history.

(56) References Cited

U.S. PATENT DOCUMENTS

| 6,163,316 | A | 12/2000 | Killian |
| 6,735,775 | B1 | 5/2004 | Massetti |
| 7,013,478 | B1 | 3/2006 | Hendricks et al. |
| 7,134,074 | B2 | 11/2006 | Munetsugu et al. |
| 2002/0118954 | A1 | 8/2002 | Barton et al. |
| 2002/0174430 | A1 | 11/2002 | Ellis et al. |
| 2002/0194586 | A1 | 12/2002 | Gutta et al. |
| 2003/0066068 | A1 | 4/2003 | Gutta et al. |
| 2003/0066074 | A1* | 4/2003 | Zimmerman et al. ......... 725/14 |
| 2003/0225777 | A1 | 12/2003 | Marsh |
| 2004/0015984 | A1* | 1/2004 | Yamamoto et al. ............ 725/28 |
| 2004/0031045 | A1 | 2/2004 | Ivanyi |
| 2004/0091235 | A1 | 5/2004 | Gutta |
| 2004/0210661 | A1 | 10/2004 | Thompson |
| 2005/0141542 | A1 | 6/2005 | Handekyn et al. |

(Continued)

FOREIGN PATENT DOCUMENTS

| JP | 2007129531 A | 5/2007 |
| WO | 98/37696 A1 | 8/1998 |
| WO | 03/041383 A2 | 5/2003 |

OTHER PUBLICATIONS

"YouTube—Broadcast Yourself," http://www.youtube.com/, copyright 2009 YouTube, LLC, printed Aug. 13, 2009, 2 pages.
Abstract, Japanese Patent Publication No. 2007-129531, published May 24, 2007, "Program Presentation System," Japanese Patent Application No. 2005-0320619, filed Nov. 4, 2005, Applicant: National Institute of Information & Communication Technology, Inventors: Miyamori Hisashi et al., obtained from www.espacenet.com, printed May 1, 2009, 1 page.

(Continued)

*Primary Examiner* — Nasser Goodarzi
*Assistant Examiner* — Hyun Hong

(57) ABSTRACT

A method and system for constructing and presenting a consumption profile, a rating profile, or both a consumption profile and a rating profile for a media item are provided. In general, consumption of a media item by a number of first users is tracked. Thereafter, before and/or during playback of the media item by a second user, a consumption profile for the media item is constructed and presented to the second user. In addition to or as an alternative to tracking consumption of the media item by the first users, ratings for the media item may be obtained from all or a subset of the first users. Thereafter, before and/or during playback of the media item by the second user, a rating profile for the media item is constructed and presented to the second user.

32 Claims, 6 Drawing Sheets

(56) References Cited

U.S. PATENT DOCUMENTS

| | | |
|---|---|---|
| 2005/0246391 A1 | 11/2005 | Gross |
| 2005/0278741 A1 | 12/2005 | Robarts et al. |
| 2006/0004704 A1 | 1/2006 | Gross |
| 2006/0015895 A1* | 1/2006 | Stone ............................. 725/32 |
| 2006/0179454 A1* | 8/2006 | Shusman ........................ 725/45 |
| 2006/0218573 A1* | 9/2006 | Proebstel ....................... 725/14 |
| 2006/0288368 A1 | 12/2006 | Huslak et al. |
| 2008/0072246 A1 | 3/2008 | Meng |
| 2008/0115166 A1 | 5/2008 | Bhogal et al. |
| 2009/0046139 A1* | 2/2009 | Cutler et al. ............... 348/14.08 |

OTHER PUBLICATIONS

Harrison, C. and Amento, B., "CollaboraTV: Using Asynchronous Communication to Make TV Social Again," TICSP Adjunct Proceedings of EuroITV 2007, Amsterdam, Netherlands, May 24-25, 2007, pp. 218-222, 5 pages.

Weisz, J.D., "Social Online Video Experiences," Thesis Proposal, Mar. 2008, School of Computer Science, Carnegie Mellon University, Pittsburgh, Pennsylvania, 79 pages.

\* cited by examiner

METHOD AND SYSTEM FOR CONSTRUCTING AND PRESENTING A CONSUMPTION PROFILE FOR A MEDIA ITEM

FIELD OF THE INVENTION

The present invention relates to constructing and presenting a consumption profile for a media item.

BACKGROUND OF THE INVENTION

Online video services are becoming increasingly popular. Typically, when a user begins watching a video item, he will watch the first few seconds or minutes of the video item and then decide whether to continue watching the video item. However, this approach has at least two issues. First, the user must watch at least some of the video item before deciding whether he desires to watch the entire video item. Second, the first few seconds or minutes of the video item may not accurately reflect whether the video item is actually desirable to the user. As such, there is a need for a method and system enabling a user to quickly and accurately determine whether a particular video item is desirable.

SUMMARY OF THE INVENTION

The present invention relates to constructing and presenting a consumption profile, a rating profile, or both a consumption profile and a rating profile for a media item. In general, consumption of a media item by a number of first users is tracked. For each of the first users, as the first user plays the media item, information is recorded as to which segments of the media item were consumed by the first user. Thereafter, before and/or during playback of the media item by a second user, a consumption profile for the media item is constructed and presented to the second user. In one embodiment, the consumption profile is a graphical representation presented in association with a scrubber bar of a Graphical User Interface (GUI) of a media playback application providing playback of the media item for the second user. For each of a number of segments of the media item, the consumption profile is indicative of a number or percentage of the first users that consumed the segment of the media item. Based on the consumption profile, the second user can quickly and easily determine which segments of the media item have previously been consumed by a large number of users, consumed by a small number of users, and like.

In addition to or as an alternative to tracking consumption of the media item by the first users, ratings for the media item may be obtained from all or a subset of the first users. For each of the first users that provides a rating, the rating from the first user is applied to a last segment of the media item consumed by the first user before the first user terminated playback or all segments of the media item consumed by the first user. Thereafter, before and/or during playback of the media item by the second user, a rating profile for the media item is constructed and presented to the second user. For each of the segments of the media item, the rating profile is indicative of an aggregate rating for the segment. In one embodiment, the aggregate rating of a segment of the media item is an average of the ratings applied to the segment of the media item by the first users.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
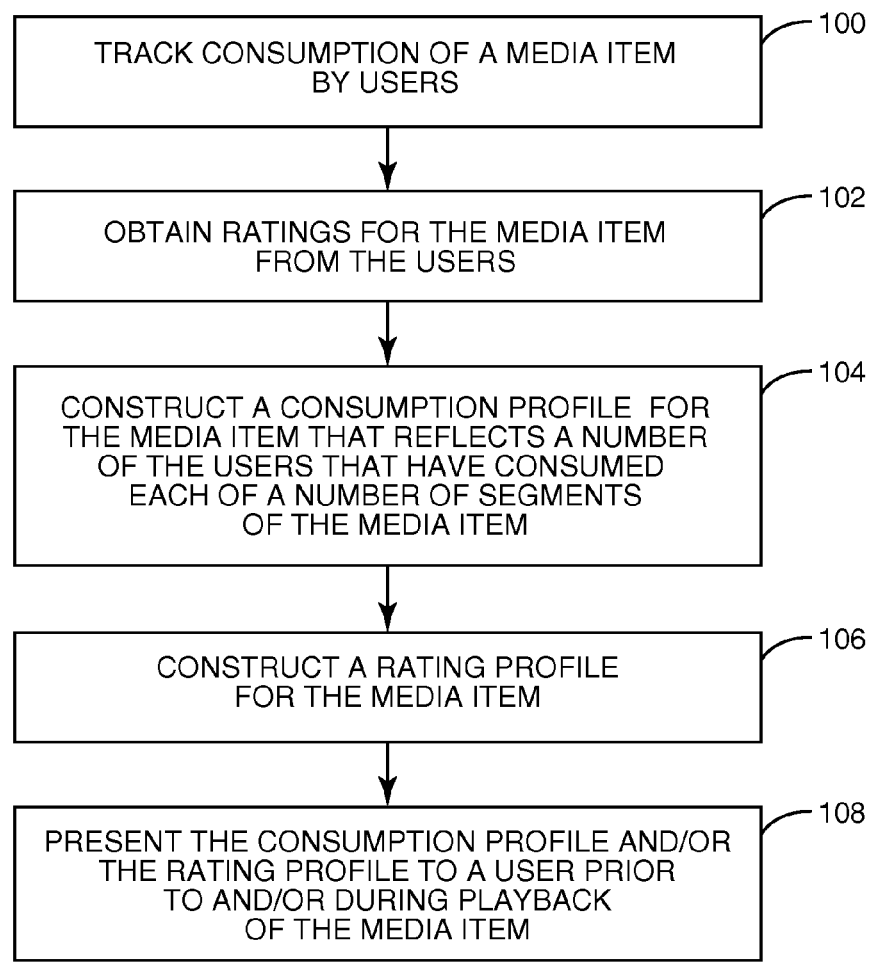
FIG. 1 is a flow chart illustrating a process for generating and presenting a consumption profile and a rating profile for a media item according to one embodiment of the present invention.

FIG. 1 illustrates a process for constructing and presenting a consumption profile and a rating profile for a media item according to one embodiment of the present invention. The media item may be, for example, a video item such as, but not limited to, a movie, television program, or user-generated video clip; an audio item such as, but not limited to, a song, radio program, or audio book; a slideshow; or the like. First, consumption of the media item by a number of users is tracked (step 100). More specifically, users obtain the media item from a streaming content server, a download server, a digital television network, or the like. As the users play the media item, the consumption (e.g., listening, viewing, or the like) of the media item by the users is tracked. In one embodiment, the media item is logically divided into a number of segments. The number of segments may be a static number of segments such as, for example, ten segments each corresponding to ten percent of the playback length of the media time. Alternatively, the number of segments may be dynamically determined based on, for example, the playback length of the media item. Thus, for example, the media item may be divided into a number of five-minute segments where the number of segments depends on the total playback length of the media item. Then, for each segment of the media item, consumption is tracked by tracking the number of users that have consumed, or played, the segment or a percentage of a total number of users that have consumed any portion of the media item that have consumed the segment.

As an example, if a user begins playback of the media item, continues to play the media item through the first three segments of the media item, and then terminates playback, then the user has consumed the first three segments of the media item. As another example, if the user begins playback of the media item, plays the first three segments of the media item, skips to the tenth segment, plays the tenth through twelfth segments, and then terminates playback, then the user has consumed segments 1, 2, 3, 10, 11, and 12 of the media item. Note that for each user, a user profile of the user may be linked to the segments of the media item consumed by the user. The user profile may include media preferences of the user such as, for example, preferred music genres, preferred music artists, preferred decades, preferred video genres, preferred actors and actresses, or the like. The user profile may additionally or alternatively include demographic information describing the user such as, for example, an age of the user, a gender of the user, a home address of the user, an income level of the user, or the like.

Optionally, ratings for the media item may be obtained from the users that have played any portion of the media item (step 102). In one embodiment, when a user terminates playback of the media item, a prompt may be presented to the user enabling the user to rate the media item. The rating may be, for example, one through five stars. If the user chooses to select a rating, the selected rating is then applied to the segment of the media item during which the user terminated playback. In addition, the rating may be applied to all other segments of the media item consumed by the user. In addition or alternatively, the users may be enabled to apply separate ratings to each segment of the media item consumed by the users. The ratings applied by the users are recorded and used to provide a rating profile, as discussed below.

A consumption profile for the media item is then constructed, or generated, based on the tracked consumption of the media item by the users that have previously played the media item (step 104). The consumption profile is indicative of the number or percentage of users that have viewed each segment of the media item. Preferably, the consumption profile is a graphical representation. However, the present invention is not limited thereto. In one embodiment, the consumption profile is a histogram providing the statistical frequency of users that have consumed each of the segments of the media item. In addition, a rating profile may optionally be constructed, or generated, for the media item based on the ratings assigned by the users that have previously played the media item (step 106). More specifically, an aggregate rating may be determined for each segment of the media item. The aggregate rating for a segment of the media item is the aggregate of the ratings applied to the segment by the users that have previously played the media item. In one embodiment, for each segment, the aggregate rating of the segment is the average of the ratings applied to that segment. The rating profile provides the aggregate rating of each of the segments of the media item. Preferably, the rating profile is a graphical representation providing the aggregate rating of each of the segments of the media item. However, the present invention is not limited thereto.

Note that, in the discussion above, the consumption and rating profiles are generated based on all users that have previously consumed any portion of the media item. However, in another embodiment, the consumption and rating profiles may be customized to a particular user. More specifically, prior to or during playback of the media item by a user, the consumption profile and/or the rating profile may be generated based on prior consumption and ratings by users having user profiles that match, at least to a threshold degree, a user profile of the user. Thus, the consumption profile may be generated based on the tracked consumption of the media item by users having user profiles that match, at least to a threshold degree, the user profile of the user. Likewise, the rating profile may be generated based on the ratings applied to the media item by users having user profiles that match, at least to a threshold degree, the user profile of the user. In addition to or as an alternative to using the user profiles to customize the consumption and rating profiles for the user, one or more other criteria may be used. For example, the one or more criteria may be a time period such that only the consumption and ratings of other users that consumed the media item during that time period are used to construct the consumption and rating profiles. As another example, rather than identifying other users having matching user profiles, the user for which the profiles are to be generated may specify one or more criteria for selecting the other users such as, for example, a desired age range, a desired gender, a desired income level, or the like.

The consumption profile of the media item, the rating profile of the media item, or both the consumption profile and the rating profile are then presented to a user prior to playback of the media item by the user, during playback of the media item by the user, or both prior to and during playback of the media item by the user (step 108). For example, if the media item is provided by a streaming content server such as that associated with a video sharing service such as YouTube, the consumption profile and/or the rating profile may be presented as part of a description of the media item, presented in association with a link or reference to the media item, presented in association with or as part of an interface providing playback of the media item, or the like. The consumption profile and the rating profile may each be presented as, for example, a graphical representation such as the ones discussed below with respect to FIGS. 2 and 3, in a table format, or the like.

Figure 2:
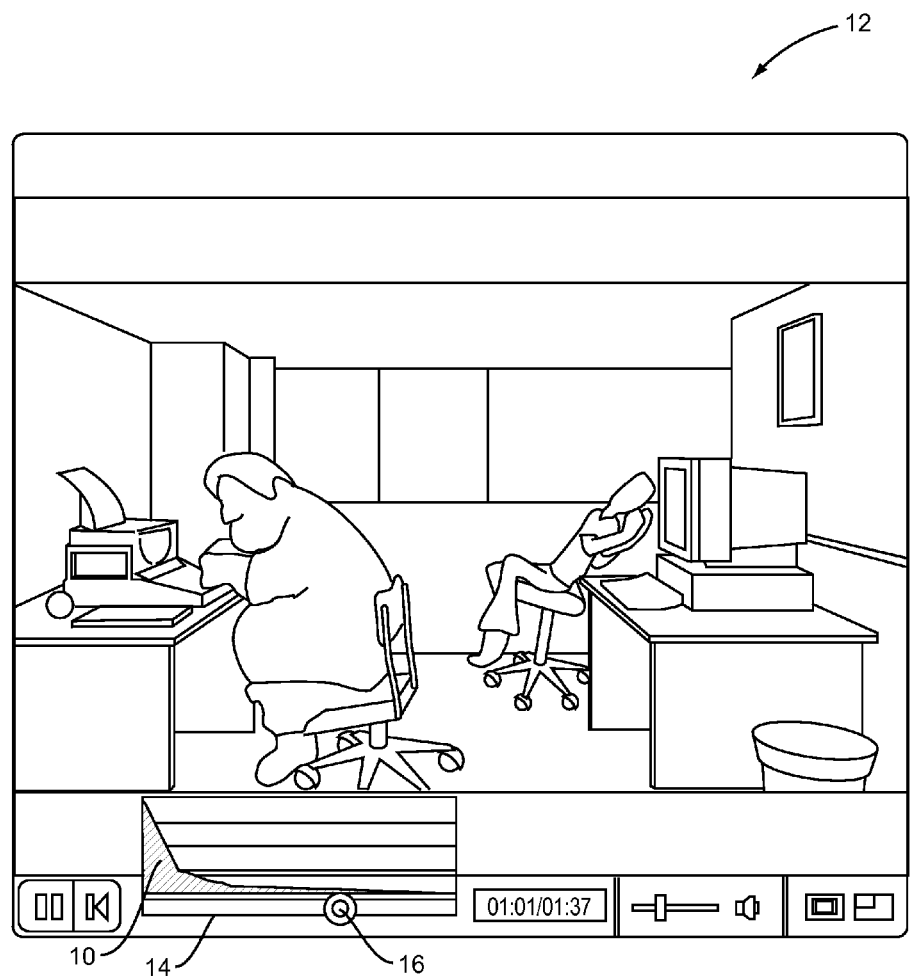
FIG. 2 is an exemplary Graphical User Interface (GUI) of a media playback application wherein a consumption profile for a media item is presented in association with a scrubber bar according to one embodiment of the present invention.

FIG. 2 illustrates an exemplary embodiment of the present invention wherein a consumption profile 10 is presented within a Graphical User Interface (GUI) 12 of a media playback application prior to and during playback of a media item. More specifically, in the illustrated embodiment, the media item is a video item such as a movie, and the consumption profile 10 is a viewing profile 10. The viewing profile 10 is aligned with, or correlated with, a scrubber bar 14 of the GUI 12 such that each point in the viewing profile 10 is indicative of a number or percentage of users that have viewed a corresponding segment of the video item indicated by the scrubber bar 14. As such, the user is enabled to quickly and easily determine which segments of the video item have been viewed by a large number of users, which segments of the video item have been viewed by a relatively small number of users, and the like. Thus, in this example, the viewing profile 10 indicates that most users terminated playback of the video item within the first 10-15 seconds of playback of the video item. Note that while the viewing profile 10 in this example is a simple example where the number of viewers decreases over time, the present invention is not limited thereto. The viewing profile 10 may include spikes where users have skipped to and viewed particular segments of the video item and dips where users have skipped over segments of the video item. A control 16 on the scrubber bar 14 indicates a current playback position of the user. The user may be enabled to slide the control 16 across the scrubber bar 14 to control playback position (e.g., skip forward, skip back, etc.).

Figure 3:
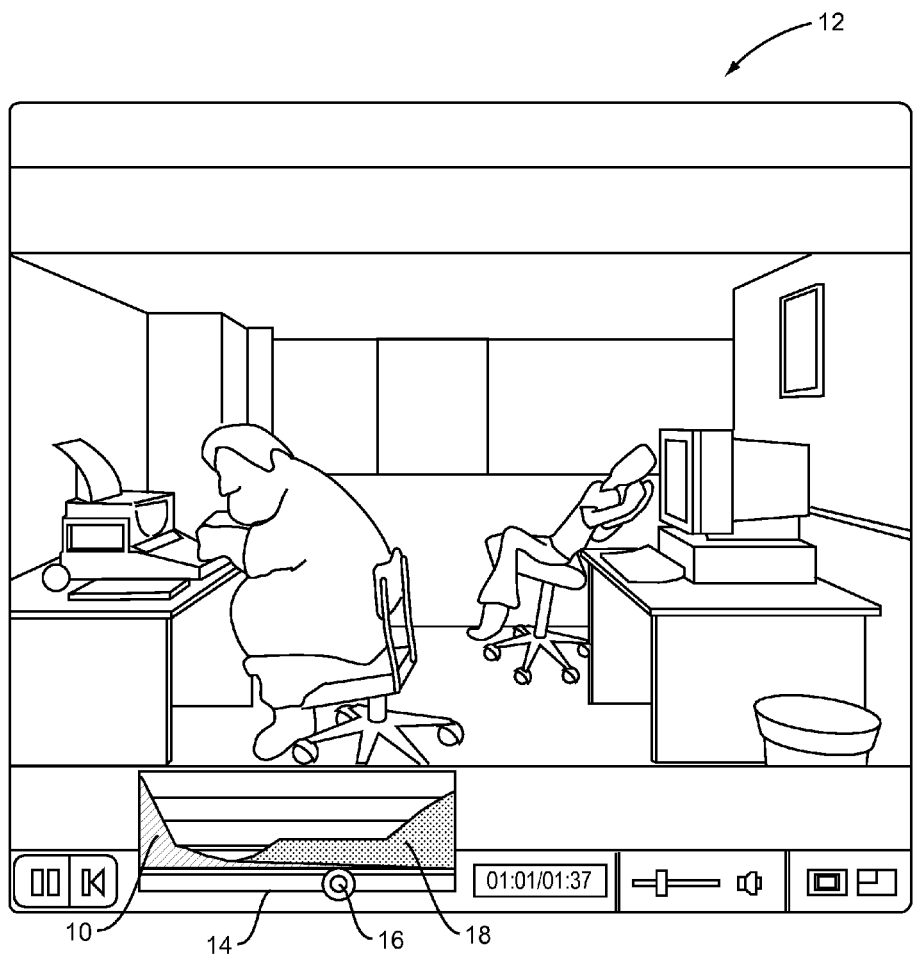
FIG. 3 is an exemplary GUI of a media playback application wherein a consumption profile and rating profile for a media item are presented in association with a scrubber bar according to another embodiment of the present invention.

FIG. 3 illustrates the GUI 12 according to another exemplary embodiment of the present invention wherein the viewing profile 10 and a rating profile 18 are presented in association with the scrubber bar 14. Like the viewing profile 10, the rating profile 18 is aligned with, or correlated with, the scrubber bar 14 of the GUI 12 such that each point in the rating profile 18 is indicative of an aggregate rating of a corresponding segment of the video item indicated by the scrubber bar 14. As such, the user is enabled to quickly and easily determine which segments of the video item have been rated highly by previous viewers, rated low by previous viewers, and the like. In this example, the longer users have viewed the video item, the higher they have rated the video item.

Note that the instantaneous rate-of-change or slope of the consumption profile and/or the rating profile may additionally or alternatively be presented to the user. For example, the rate-of-change of the rating profile, or aggregate rating versus playback time, may be determined and presented as an indicator of the desirability of the corresponding segment of the media item to the users that previously consumed that segment. The more positive the rate-of-change of the rating profile, the higher the desirability of the corresponding segment. Likewise, the rate-of-change of the consumption profile may be determined and presented. As one exemplary alternative, the instantaneous rate-of-change of the rating profile and the instantaneous rate-of-change of the consumption profile may be combined to provide an indicator of user interest for each of the segments of the media item.

Figure 4:
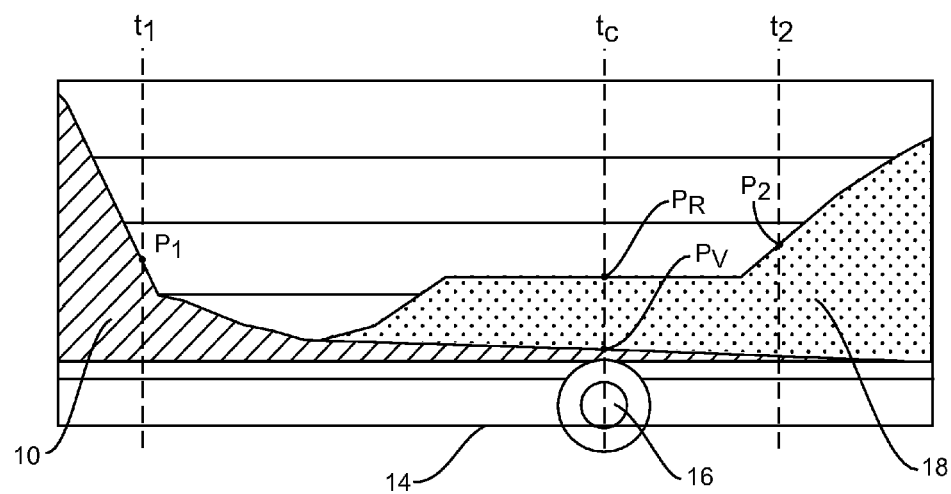
FIG. 4 is a blow-up of the consumption profile and rating profile of FIG. 3.

FIG. 4 is a blow-up of the viewing profile 10 and the rating profile 18 of FIG. 3. The viewing profile 10 is aligned with, or correlated with, the scrubber bar 14. For example, at a point on the scrubber bar 14 corresponding to a time $t_1$ during playback of the video item, a corresponding point $P_1$ on the viewing profile 10 is indicative of the number or percentage of users that have viewed that segment of the video item. Likewise, the rating profile 18 is aligned with, or correlated with, the scrubber bar 14. For example, at a point on the scrubber bar 14 corresponding to a time $t_2$ during playback of the video item, a corresponding point $P_2$ on the rating profile 18 is indicative of the aggregate rating of that segment of the video item.

Similarly, the control 16 on the scrubber bar 14 is indicative of the current position of the user in playback of the video item, which in this example is a time $t_C$. Note that the user may move the control 16 to skip back or forward in playback of the video item. Also, corresponding points $P_V$ and $P_R$ on the viewing profile 10 and the rating profile 18 are indicative of the number or percentage of users that have viewed that segment of the video item and the aggregate rating of that segment of the video item, respectively.

Figure 5:
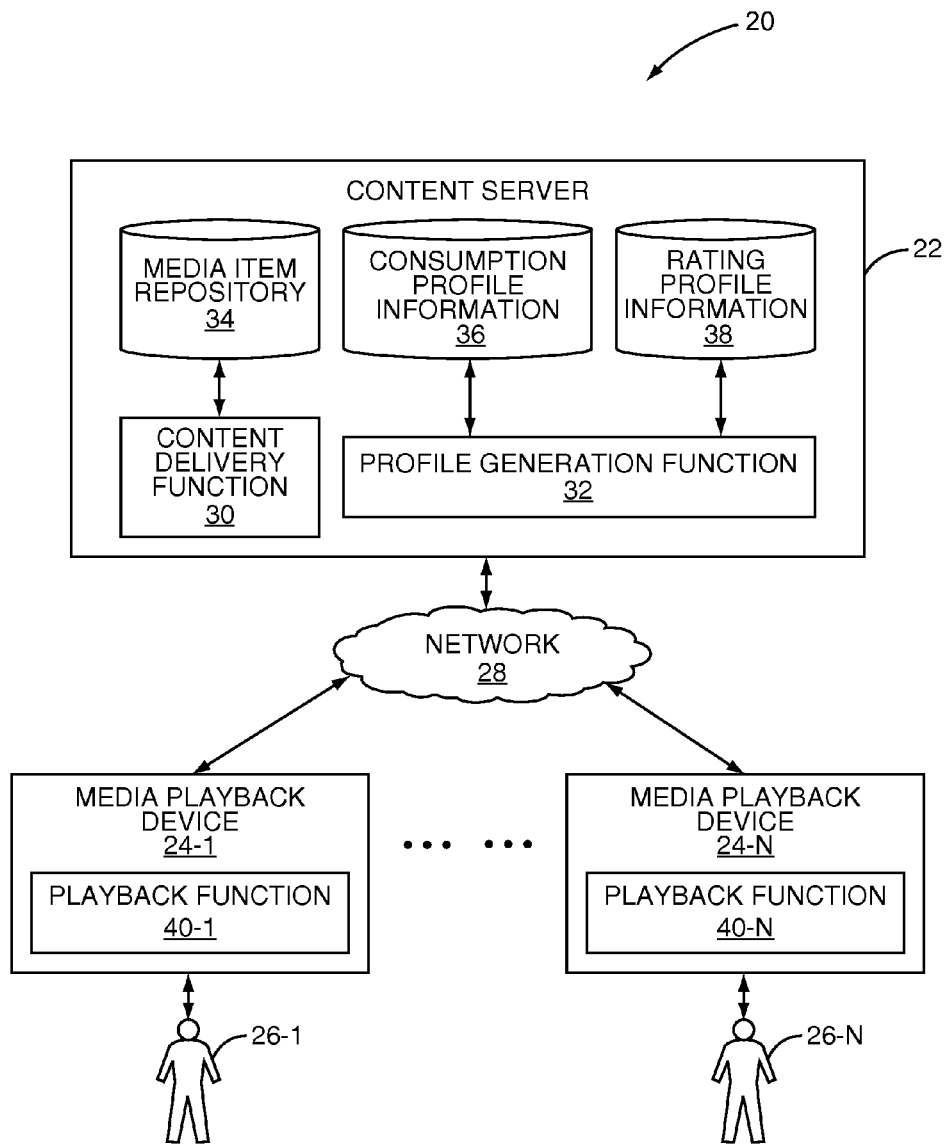
FIG. 5 illustrates a system for generating and presenting a consumption profile and a rating profile for a media item according to one embodiment of the present invention.

FIG. 5 illustrates a system 20 for constructing and presenting consumption profiles and rating profiles for media items according to one embodiment of the present invention. In general, the system 20 includes a content server 22 and a number of media playback devices 24-1 through 24-N having associated users 26-1 through 26-N. The media playback devices 24-1 through 24-N connect to the content server 22 via a network 28. The network 28 may be a Wide Area Network (WAN), Local Area Network (LAN), or any combination thereof. Further, the network 28 may include wired components, wireless components, or both wired and wireless components. For example, the network 28 may be a distributed public network such as the Internet.

In this embodiment, the content server 22 includes a content delivery function 30 and a profile generation function 32, each of which may be implemented in software, hardware, or a combination thereof. The content delivery function 30 operates to deliver media items from a media item repository 34 to the media playback devices 24-1 through 24-N for playback. In one embodiment, the content delivery function 30 streams the media items from the media item repository 34 to the media playback devices 24-1 through 24-N upon request by the users 26-1 through 26-N. In another embodiment, the content delivery function 30 downloads the media items from the media item repository 34 to the media playback devices 24-1 through 24-N upon request by the users 26-1 through 26-N. For example, the content server 22 may host an e-commerce service wherein the users 26-1 through 26-N purchase media items such as songs, videos, or the like. Thus, when, for example, the user 26-1 purchases a media item, the content delivery function 30 downloads the media item, and more specifically a copy of the media item, to the media playback device 24-1 of the user 26-1.

The profile generation function 32 generally operates to perform the process of FIG. 1. More specifically, the profile generation function tracks consumption of the media items in the media item repository 34 by the users 26-1 through 26-N and stores resulting consumption profile information 36. Using the user 26-1 as an example, the user 26-1 requests a media item. In response, the content delivery function 30 delivers the requested media item to the media playback device 24-1 for playback to the user 26-1. As the user 26-1 plays, or consumes, the requested media item, the profile generation function 32 tracks consumption of the requested media item by the user 26-1. More specifically, as the user 26-1 plays the requested media item, the media playback device 24-1 reports playback behavior of the user 26-1 to the profile generation function 32. The media playback device 24-1 may report the playback behavior continuously as long as the user 26-1 is playing the media item, where the playback behavior may be continuous updates to the playback position of the user 26-1. Alternatively, the media playback device 24-1 may report the playback behavior periodically. For example, the profile generation function 32 may notify the media playback device 24-1 of the segments of the media item. The media playback device 24-1 may then track which segments are consumed by the user 26-1 and periodically report the segments that are consumed by the user 26-1 to the profile generation function 32. As another alternative embodiment, the media playback device 24-1 may report the playback behavior to the profile generation function 32 using an event-based reporting scheme. More specifically, the media playback device 24-1 may report playback events such as start playback, pause, skip, and the like to the profile generation function 32. Based on the reported events, the profile generation function 32 determines which segments of the media item are consumed by the user 26-1. In a similar manner, the profile generation function 32 tracks consumption of each of the media items in the media item repository 34 by the users 26-1 through 26-N.

For each media item in the media item repository 34, the consumption profile information 36 stored as a result of the consumption tracking generally includes information defining, for each segment of the media item, the number of users that have consumed the segment of the media item or a percentage of users that have consumed one or more of the segments of the media item that have consumed the segment of the media item. In addition, for each segment of each media item in the media item repository 34, the consumption profile information 36 may include a reference or link to the user profiles of the users from the users 26-1 through 26-N that have consumed the segment of the media item. In addition, for each user that has consumed a segment of the media item, the consumption profile information 36 may include additional information such as, for example, a time stamp defining a time at which the user consumed the segment of the media item.

In addition to tracking consumption of the media items, the profile generation function 32 may obtain ratings for the media items in the media item repository 34 from the users 26-1 through 26-N and store related rating profile information 38. For example, after requesting and starting playback of a media item, the user 26-1 may be enabled to apply a rating to the media item. In one embodiment, when the user 26-1 terminates playback of the media item, a prompt is presented to the user 26-1 enabling the user 26-1 to select a rating for the media item. The selected rating is then assigned to the segment of the media item at which the user 26-1 terminated playback or all segments of the media item consumed by the user 26-1. Alternatively, the user 26-1 may be enabled to separately assign ratings to each segment of the media item consumed by the user 26-1. In a similar manner, the profile generation function 32 may obtain ratings for each media item in the media item repository 34 from users that have consumed one or more segments of the media item.

The rating profile information 38 may include the assigned ratings for each segment of each media item in the media item repository 34. The aggregate rating for each segment of each media item may then be generated by aggregating or combining the ratings for that segment. For example, the aggregate rating for a segment of a media item may be the average of the ratings applied to that segment. Alternatively, if the aggregate rating for each segment of each media item is an average of the ratings assigned to that segment, the rating profile information 38 may include a sum of the ratings for each segment of each media item in the media item repository 34. The aggregate rating for each segment of each media item may then be provided by dividing the sum of all ratings applied to that segment by the number of users that have consumed that segment, which may be obtained from the consumption profile information 36.

The profile generation function 32 generates the consumption profile and the rating profile for each media item in the media item repository 34 based on the consumption profile information 36 and the rating profile information 38, respectively. The profile generation function 32 then presents the consumption profiles and rating profiles of the media items or causes the consumption profiles and rating profiles to be presented as needed. As discussed above, the consumption profile and rating profile for a media item may be presented in a description of the media item, presented in association with a reference or link to the media item, presented in association with the media item prior to playback, presented in association with the media item during playback, or the like.

For example, in one embodiment, the content delivery function 30 streams the media items in the media item repository 34 to the media playback devices 24-1 through 24-N upon request. As such, when, for example, the user 26-1 requests a media item from the content delivery function 30, the profile generation function 32 generates the consumption profile and the rating profile for the requested media item. Alternatively, the consumption profile and the rating profile may be generated in advance. The profile generation function 32 may then provide the consumption profile and the rating profile to the media playback device 24-1 for presentation to the user 26-1 in association with the requested media item. Alternatively, the profile generation function 32 may provide the consumption profile and the rating profile to the content delivery function 30, which then provides the consumption profile and the rating profile in association with the requested media item for presentation to the user 26-1.

The media playback devices 24-1 through 24-N may each be, for example, a personal computer, a portable media player having network capabilities, a mobile smart phone having media playback capabilities, a set-top box, a Personal Video Recorder (PVR) device such as a set-top box with PVR capabilities, or the like. The media playback devices 24-1 through 24-N include playback functions 40-1 through 40-N, respectively. The playback functions 40-1 through 40-N may be implemented in software, hardware, or a combination thereof. In operation, the playback function 40-1, for example, obtains a media item requested by the user 26-1 from the content server 22 and provides playback of the requested media item. The playback function 40-1 then reports consumption of the requested media item by the user 26-1 to the profile generation function 32 of the content server 22. In addition, during playback of the media item or upon termination of playback of the media item, the playback function 40-1 may enable the user 26-1 to rate the media item and then provide the rating to the profile generation function 32 of the content server 22. Still further, prior to and/or during playback of the media item, the playback function 40-1 obtains the consumption profile and/or the rating profile of the media item from the content server 22 and presents the consumption profile and/or the rating profile to the user 26-1.

In one embodiment, the playback function 40-1 may control playback of the media item based on the consumption profile and/or the rating profile for the media item. More specifically, as a first example, the user 26-1 inputs a specified amount of time and requests that the playback function 40-1 modify playback of the media item to complete playback in no more than the specified amount of time. In response, based on the rating profile, the playback function 40-1 may select one or more highest-rated segments of the media item that have a combined playback time equal to or less than the specified amount of time and provide playback of the selected segment(s) of the media item. Alternatively, based on the consumption profile, the playback function 40-1 may select one or more of the most consumed segments of the media item that have a combined playback time equal to or less than the specified amount of time and provide playback of the selected segment(s) of the media item. As a second example, the user 26-1 may instruct the playback function 40-1 to skip to the conclusion of the media item. In response, the playback function 40-1 may select the highest-rated remaining segment of the media item and provided playback of the selected segment. As a final example, the user 26-1 may instruct the playback function 40-1 to skip to the next point in playback of the media item where the rating profile trends upward. The playback function 40-1 may then skip to the next segment in the media item where the rating profile increases, increases more than a threshold amount, increases more than a threshold amount over a defined amount of time, or the like.

It should be noted that the system 20 of FIG. 5 is exemplary and not intended to limit the scope of the present invention. One of ordinary skill in the art will appreciate that the present invention may be implemented in numerous types of media playback systems. In general, the profile generation function 32 may be implemented as a centralized function as illustrated in FIG. 5 or as a distributed function. For example, the media playback devices 24-1 through 24-N may be connected via a Peer-to-Peer (P2P) overlay network, and the profile generation function 32 may be implemented on the media playback devices 24-1 through 24-N in a distributed fashion.

Further, while the content delivery function 30 is illustrated in FIG. 5 as being implemented on the content server 22 along with the profile generation function 32, the content delivery function 30 may alternatively be a third-party function.

Figure 6:
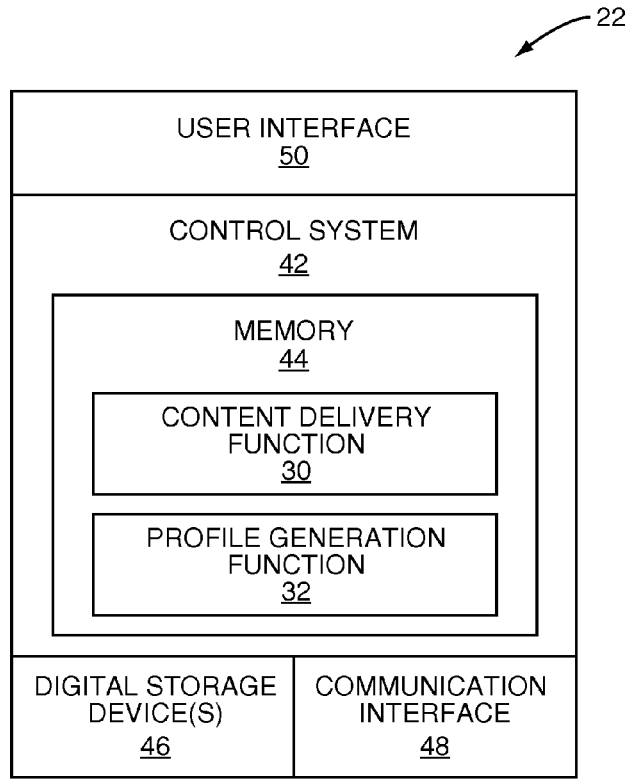
FIG. 6 is a block diagram of the content server of FIG. 5 according to one embodiment of the present invention.

FIG. 6 is a block diagram of the content server 22 of FIG. 5 according to one embodiment of the present invention. In general, the content server 22 includes a control system 42 having associated memory 44. In this embodiment, the content delivery function 30 and the profile generation function 32 are each implemented in software and stored in the memory 44. However, the present invention is not limited thereto. Each of the content delivery function 30 and the profile generation function 32 may be implemented in software, hardware, or a combination thereof. The content server 22 may also include one or more digital storage devices 46 such as, for example, one or more hard disk drives. In one embodiment, the media item repository 34, the consumption profile information 36, and the rating profile information 38 are stored in the one or more digital storage devices 46. However, the present invention is not limited thereto. For example, one or more of the media item repository 34, the consumption profile information 36, and the rating profile information 38 may be stored in the memory 44. The content server 22 also includes a communication interface 48 communicatively coupling the content server 22 to the network 28. Lastly, the content server 22 may include a user interface 50, which may include components such as, for example, a display, one or more user input devices, or the like.

Figure 7:
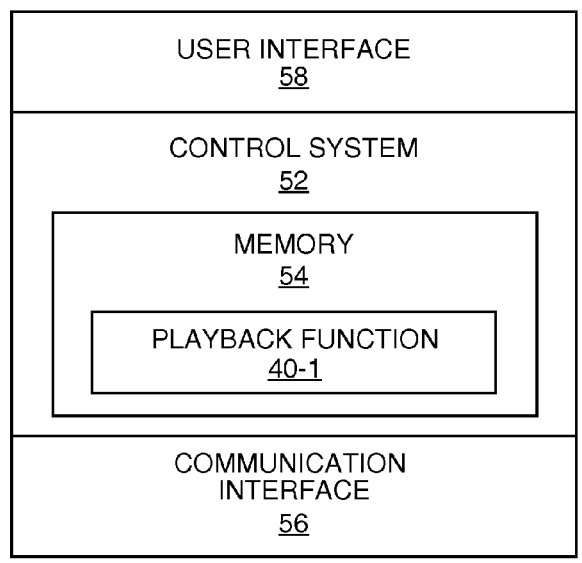
FIG. 7 is a block diagram of one of the media playback devices of FIG. 5 according to one embodiment of the present invention.

FIG. 7 is a block diagram of the media playback device 24-1 of FIG. 5 according to one embodiment of the present invention. This discussion is equally applicable to the other media playback devices 24-2 through 24-N. In general, the media playback device 24-1 includes a control system 52 having associated memory 54. In this embodiment, the playback function 40-1 is implemented in software and stored in the memory 54. However, the present invention is not limited thereto. The playback function 40-1 may be implemented in software, hardware, or a combination thereof. The media playback device 24-1 also includes a communication interface 56 communicatively coupling the media playback device 24-1 to the network 28. Lastly, the media playback device 24-1 may include a user interface 58, which may include components such as, for example, a display, one or more user input devices, one or more speakers, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising
tracking consumption of a media item by each of a plurality of first users;
generating a consumption profile for the media item based on the consumption of the media item by each of the plurality of first users, wherein for each segment of a plurality of segments of the media item, the consumption profile reflects a number of the plurality of first users that consumed the segment of the media item; and
presenting the consumption profile for the media item to a second user in association with the media item during playback of the media item by the second user, wherein presenting the consumption profile comprises presenting the consumption profile for the media item to the second user in association with a scrubber bar of a media playback application providing playback of the media item to the second user.

2. The method of claim 1 wherein for each segment of the plurality of segments, the consumption profile is indicative of one of a group consisting of: a number of the plurality of first users that consumed the segment of the media item and a percentage of the plurality of first users that consumed the segment of the media item.

3. The method of claim 1 wherein the consumption profile is a graphical representation reflecting a number of the plurality of first users that consumed each segment of the plurality of segments of the media item, and the consumption profile is aligned with the scrubber bar such that, for each segment of the media item, a portion of the consumption profile that is aligned with a portion of the scrubber bar corresponding to the segment of the media item reflects the number of the plurality of first users that consumed the segment of the media item.

4. The method of claim 1 wherein the plurality of first users are all users that have previously consumed at least a portion of the media item.

5. The method of claim 1 wherein the plurality of first users is a subset of all users that have previously consumed at least a portion of the media item that satisfy at least one criterion.

6. The method of claim 1 wherein the plurality of first users is a subset of all users that have previously consumed at least a portion of the media item that have user profiles that match a user profile of the second user at least to a desired threshold degree.

7. The method of claim 1 further comprising:
for each user from at least a subset of the plurality of first users:
obtaining a rating for the media item from the user; and
applying the rating to one of a group consisting of: a last segment of the media item consumed by the user, all segments of the media item consumed by the user, and one or more segments identified by the user;
generating a rating profile for the media item based on the ratings obtained from the at least a subset of the plurality of first users; and
presenting the rating profile for the media item to the second user.

8. The method of claim 1 further comprising controlling playback of the media to the second user based on the consumption profile.

9. The method of claim 1 further comprising:
determining a rate-of-change of the consumption profile with respect to at least one of the plurality of segments of the media item; and
presenting the rate-of-change to the second user.

10. The method of claim 7 wherein for each segment of the plurality of segments, the rating profile is indicative of an aggregate of the ratings applied to the segment of the media item.

11. The method of claim 7 wherein presenting the rating profile comprises presenting the rating profile for the media item to the second user prior to playback of the media item by the second user.

12. The method of claim 7 wherein presenting the rating profile comprises presenting the rating profile for the media item to the second user in association with the media item during playback of the media item by the second user.

13. The method of claim 7 wherein presenting the rating profile comprises presenting the rating profile for the media item to the second user in association with a scrubber bar of a media playback application providing playback of the media item to the second user.

14. The method of claim 7 wherein presenting the rating profile comprises presenting the rating profile for the media item to the second user in association with a reference to the media item.

15. The method of claim 7 wherein:
presenting the rating profile comprises presenting the rating profile for the media item to the second user prior to playback of the media item by the second user.

16. The method of claim 7 wherein:
presenting the rating profile comprises presenting the rating profile for the media item to the second user in association with the media item during playback of the media item by the second user.

17. The method of claim 7 wherein:
presenting the rating profile comprises presenting the rating profile for the media item to the second user in association with the scrubber bar of the media playback application providing playback of the media item to the second user.

18. The method of claim 7 wherein the subset of the plurality of first users is all users that have previously consumed at least a portion of the media item and provided ratings for the media item.

19. The method of claim 7 wherein the subset of the plurality of first users is a group of users that have previously consumed at least a portion of the media item, have provided ratings for the media item, and satisfy at least one criterion.

20. The method of claim 7 wherein the plurality of first users is a group of users that have previously consumed at least a portion of the media item, have provided ratings for the media item, and have user profiles that match a user profile of the second user at least to a desired threshold degree.

21. The method of claim 7 further comprising controlling playback of the media item to the second user based on the rating profile.

22. The method of claim 7 further comprising:
determining a rate-of-change of the rating profile with respect to at least one of the plurality of segments of the media item; and
presenting the rate-of-change to the second user.

23. The method of claim 13 wherein the rating profile is a graphical representation reflecting, for each segment of the media item, an aggregate of the ratings applied to the segment of the media item, and the rating profile is aligned with the scrubber bar such that, for each segment of the media item, a portion of the rating profile that is aligned with a portion of the scrubber bar corresponding to the segment of the media item reflects the aggregate of the ratings applied to the segment of the media item.

24. The method of claim 17 wherein:
the consumption profile is a graphical representation reflecting a number of the plurality of first users that consumed each segment of the media item and is aligned with the scrubber bar; and
the rating profile is a graphical representation reflecting, for each segment of the media item, an aggregate of the ratings applied to the segment of the media item and is aligned with the scrubber bar.

25. The method of claim 21 wherein controlling playback of the media item comprises skipping forward in playback to a next segment of the media item where the rating profile begins to trend upward based on the rating profile.

26. The method of claim 21 wherein controlling playback of the media item comprises:
based on the rating profile, selecting one or more highest rated segments of the media item from segments of the media item that have not yet been played by the second user and having a total playback time less than or equal to a specified amount of time; and
providing playback of the one or more highest rated segments to the second user.

27. The method of claim 21 wherein controlling playback of the media item comprises skipping to a highest rated segment from segments of the media item that have not yet been played by the second user based on the rating profile.

28. The method of claim 8 wherein controlling playback of the media item comprises skipping forward in playback to a next segment of the media item where the consumption profile begins to trend upward based on the consumption profile.

29. The method of claim 8 wherein controlling playback of the media item comprises:
based on the consumption profile, selecting one or more highest consumed segments of the media item from segments of the media item that have not yet been played by the second user and having a total playback time less than or equal to a specified amount of time; and providing playback of the one or more highest consumed segments to the second user.

30. The method of claim 8 wherein controlling playback of the media item comprises skipping to a highest consumed segment from segments of the media item that have not yet been played by the second user based on the consumption profile.

31. A central system comprising:
a communication interface communicatively coupling the central system to a plurality of media playback devices of a plurality of users; and
a control system associated with the communication interface and adapted to:
track consumption of a media item by each of a plurality of first users from the plurality of users at corresponding ones of the plurality of media playback devices;
generate a consumption profile for the media item based on the consumption of the media item by each of the plurality of first users, wherein for each segment of a plurality of segments of the media item, the consumption profile reflects a number of the plurality of first users that consumed the segment of the media item; and
present the consumption profile for the media item to a second user of the plurality of users at a corresponding one of the plurality of media playback devices in association with the media item during playback of the media item by the second user wherein presenting the consumption profile comprises presenting the consumption profile for the media item to the second user in association with a scrubber bar of a media playback application providing playback of the media item to the second user.

32. The central system of claim 31 wherein the control system is further adapted to:
for each user from at least a subset of the plurality of first users:
obtain a rating for the media item from the user; and
apply the rating to one of a group consisting of: a last segment of the media item consumed by the user, all segments of the media item consumed by the user, and one or more segments identified by the user;
generate a rating profile for the media item based on the ratings obtained from the at least a subset of the plurality of first users; and
present the rating profile for the media item to the second user at the corresponding one of the plurality of media playback devices.

* * * * *